(12) United States Patent
Daël et al.

(10) Patent No.: US 10,825,594 B2
(45) Date of Patent: Nov. 3, 2020

(54) SYSTEM FOR GENERATING A VECTOR MAGNETIC FIELD

(71) Applicant: COMMISSARIAT A L'ENERGIE ATOMIQUE ET AUX ENERGIES ALTERNATIVES, Paris (FR)

(72) Inventors: Antoine Daël, Chaville (FR); Pascal Lavie, Saint-Cheron (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 171 days.

(21) Appl. No.: 15/944,127

(22) Filed: Apr. 3, 2018

(65) Prior Publication Data

US 2018/0301261 A1   Oct. 18, 2018

(30) Foreign Application Priority Data

Apr. 3, 2017   (FR) ..................................... 17 52841

(51) Int. Cl.
| | | |
|---|---|---|
| *G01N 27/72* | (2006.01) | |
| *H01F 6/06* | (2006.01) | |
| *H01F 6/04* | (2006.01) | |

(52) U.S. Cl.
CPC ............... *H01F 6/06* (2013.01); *G01N 27/72* (2013.01); *H01F 6/04* (2013.01)

(58) Field of Classification Search
CPC .................. H01F 6/04; H01F 6/06; F25B 9/10
See application file for complete search history.

(56) References Cited

U.S. PATENT DOCUMENTS

| | | | | |
|---|---|---|---|---|
| 5,932,096 A | * | 8/1999 | Saho | ....................... B03C 1/027 209/223.1 |
| 5,956,957 A | * | 9/1999 | Lowry | ..................... F17C 3/085 62/48.3 |
| 2004/0041673 A1 | * | 3/2004 | Kakugawa | ......... G01R 33/3806 335/299 |
| 2009/0210199 A1 | * | 8/2009 | Tsuda | ................. G01R 33/3804 702/188 |

(Continued)

FOREIGN PATENT DOCUMENTS

| | | |
|---|---|---|
| CN | 204991328 U | 1/2016 |
| EP | 2 743 717 A1 | 6/2014 |

(Continued)

OTHER PUBLICATIONS

Search Report as issued in French Patent Application No. 1752841, dated Jan. 25, 2018.

*Primary Examiner* — Alvaro E Fortich
(74) *Attorney, Agent, or Firm* — Pillsbury Winthrop Shaw Pittman LLP

(57) ABSTRACT

A system for generating a magnetic field orientable in three dimensions configured to be integrated in a test vessel in which an ultra-high vacuum medium reigns, the system for generating a vector magnetic field being including superconducting coils, a cooling system making it possible to cool the superconducting coils to a superconducting temperature; a leaktight case, leaktight to the ultra-high vacuum and compatible with the ultra-high vacuum, the leaktight case enclosing the superconducting coils and being cooled by the cooling system; a heat shield compatible with the ultra-high vacuum surrounding the leaktight case.

15 Claims, 1 Drawing Sheet

(56) References Cited

U.S. PATENT DOCUMENTS

| | | | |
|---|---|---|---|
| 2010/0283564 A1* | 11/2010 | Takeda | H01F 6/06 335/216 |
| 2011/0130293 A1* | 6/2011 | Kawashima | H01F 6/04 505/163 |
| 2012/0167598 A1 | 7/2012 | Diederichs et al. | |
| 2013/0033346 A1* | 2/2013 | Wang | H01F 6/04 335/216 |
| 2013/0045870 A1* | 2/2013 | Rogers | B65D 88/741 505/163 |

FOREIGN PATENT DOCUMENTS

| | | |
|---|---|---|
| EP | 3 142 131 A1 | 3/2017 |
| JP | H01-149406 A | 6/1989 |

* cited by examiner

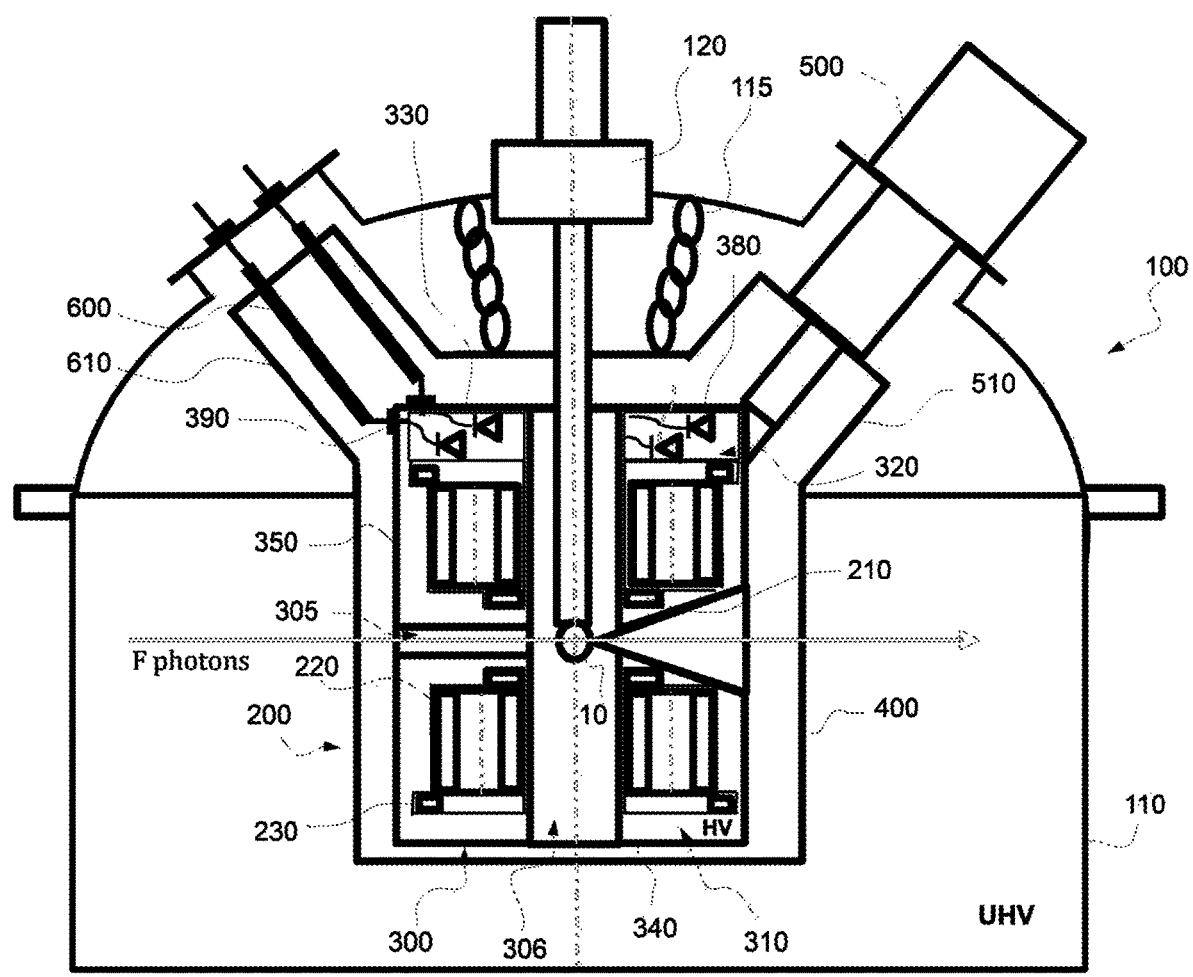

SYSTEM FOR GENERATING A VECTOR MAGNETIC FIELD

CROSS-REFERENCE TO RELATED APPLICATION

This application claims priority to French Patent Application No. 1752841, filed Apr. 3, 2017, the entire content of which is incorporated herein by reference in its entirety.

TECHNICAL FIELD

The invention relates to an integration device making it possible to use, in an existing test vessel and in which an ultra-high vacuum medium reigns, a system for generating a strong locally homogenous magnetic field, that is to say substantially homogenous in a predefined region of space, and orientable in three dimensions, or at least in one plane, from a set of superconducting coils.

PRIOR ART

To conduct certain scientific experiments, notably neutron diffraction or scattering, it is necessary to subject a sample to a vector magnetic field orientable in all directions of space. The patent application EP 2743717 describes for example a novel device for generating an orientable and/or turning and locally homogenous magnetic field having both axial access for the easy introduction of a sample and a wide equatorial angular aperture to enable the passage of beams of particles (notably neutrons) or photons and the placing of suitable detection systems over a wide horizontal and vertical aperture. The device described in the document EP 2743717 has been developed to respond particularly to the needs of neutron diffraction and scattering studies.

The principle consists in using a particular layout of a set of coaxial superconducting coils regularly arranged along a circle to generate a homogenous magnetic field oriented in a radial direction (perpendicular to the axial direction).

Thus, it is necessary to place the coils in superconducting conditions while respecting the thermal insulation conditions, which are very elaborate and which require great care, and to have available cooling means to reach the very low temperatures necessary for the windings to operate in superconduction.

Generally speaking, the simplest way to cool superconducting coils is to immerse them in liquid helium at 4.2K. But for several years some manufacturers have been proposing the use of cryomagnets, the windings of which are cooled by means of cryogenerators.

However, the use of such superconducting coils and a cryogenerator causes certain realisation difficulties once the vacuum necessary for the experimentation is an ultra-high vacuum (i.e. below $10^{-7}$ mbar).

Indeed, the use of a cryostat to place the coils in superconducting conditions in a medium where an ultra-high vacuum reigns risks perturbing this vacuum, denaturing the quality of the samples, notably by degassing phenomena, and pressure rises, etc.

DESCRIPTION OF THE INVENTION

In this context, the present invention aims to resolve the aforementioned problems and aims to propose a device making it possible to integrate a system for generating a vector magnetic field in a pre-existing test vessel and in which an ultra-high vacuum is necessary for the experimentation. Such an approach has numerous technical difficulties that the invention aims to resolve by proposing innovative solutions in magnetism, and in cryogenics.

The existing conventional and known approach of the prior art consists in constructing a test vessel around the main element constituted of magnets or coils necessary for the experimentation by arranging a "useful exploitation zone" and a "sample zone" for handling, which constrains the architectures of the experimental lines and makes it necessary to construct the experiment around the magnetic device.

The invention aims in contrast to propose a simple, complete, modular and leaktight system for generating a magnetic field that can be integrated in any existing test vessel and notably in experimental vessels where an ultra-high vacuum medium reigns without denaturing the sample or destroying handling under ultra-high vacuum.

To this end, the invention relates to a system for generating a magnetic field orientable in three dimensions configured to be integrated in a test vessel in which an ultra-high vacuum medium reigns, said system for generating a vector magnetic field being characterised in that it comprises:
  superconducting coils,
  cooling means making it possible to cool the superconducting coils to a superconducting temperature;
  a leaktight case, leaktight to the ultra-high vacuum and compatible with the ultra-high vacuum, said leaktight case enclosing said superconducting coils and being cooled by said cooling means;
  a heat shield compatible with the ultra-high vacuum surrounding said leaktight case.

The principle of use and all of the technical solutions according to the invention make it possible to place directly the superconducting magnetic device in an existing test vessel in which an ultra-high vacuum reigns, which ultra-high vacuum is used for the thermal insulation of said device.

The term "compatible with ultra-high vacuum" signifies that the materials used are compatible with the ultra-high vacuum medium and that the implementation (cleaning, baking, manufacturing process) is carried out so as to ensure that the cleanliness or the ultra-high vacuum conditions will not be degraded.

The heat shield compatible with the ultra-high vacuum surrounding said leaktight case is both heat conductor and heat reflector.

The system for generating a magnetic field orientable in three dimensions according to the invention may also have one or more of the characteristics below, considered individually or according to all technically possible combinations thereof:
  the heat shield comprises a heat conducting element covered with a heat reflecting layer;
  the heat conducting element and/or the heat reflecting layer is metal;
  the heat conducting element is a heat conducting metal sheet made of copper or aluminium;
  the heat shield comprises a metal heat reflecting layer made of nickel;
  said leaktight case is formed by a solid one-piece body;
  said leaktight case comprises housings machined in said one-piece body for the positioning of the superconducting coils;
  said one-piece body is closed on either side, in a leaktight manner, by an end flange;

said one-piece body comprises a housing in which elements for protecting the superconducting coils are positioned;

said leaktight case comprises leaktight, insulating and superconducting electrical power penetrations for supplying said superconducting coils;

said leaktight case has a central well to enable the placement of a sample in the middle of the magnetic field generated by said superconducting coils;

said cooling means making it possible to cool the superconducting coils to a superconducting temperature are surrounded by a heat shield compatible with the ultra-high vacuum;

the system comprises current feeds and in that said current feeds are surrounded by a heat shield;

said cooling means making it possible to cool the superconducting coils to a superconducting temperature have a first stage for the cooling of said heat shield of the leaktight case and/or the heat shield of the cooling means and/or the heat shield of the current feeds and a second stage for the cooling of said leaktight case and the superconducting coils to the superconducting temperature, the temperature of said first stage being above the temperature of the second stage;

the first stage cools to a temperature of 50K and the second stage cools to a temperature of 4K;

said cooling means making it possible to cool the superconducting coils to a superconducting temperature are formed by at least one cryogenerator.

The invention also relates to a test vessel comprising a leaktight chamber in which the ultra-high vacuum reigns characterised in that said test vessel comprises a system for generating a magnetic field orientable in three dimensions according to the invention and in that the ultra-high vacuum of said vessel constitutes a thermal insulation vacuum necessary for the cooling of the superconducting coils of the system for generating a vector magnetic field.

BRIEF DESCRIPTION OF THE FIGURES

Other characteristics and advantages of the invention will become clearer from the description that is given thereof below, for indicative purposes and in no way limiting, with reference to the single FIGURE which represents an overall view of a test vessel comprising a system for generating a vector magnetic field (orientable in three dimensions) according to the invention and more precisely the current feeds, the cryogenerators as well as the principle for supporting and the system for placing the sample.

DESCRIPTION OF AT LEAST ONE EMBODIMENT

The single FIGURE represents a test vessel 100 having a leaktight chamber 110 in which an ultra-high vacuum (UHV) reigns (that is to say a vacuum characterised by a pressure below $10^{-7}$ mbar) and which comprises a modular system for generating a vector magnetic field 200 (orientable in three dimensions) according to the invention. Such a test vessel 100 may be used for example for the crystallographic study of a sample placed in said vector magnetic field and under a beam of photons $F_{photons}$.

Such a system for generating a vector magnetic field 200 (orientable in three dimensions) according to the invention has the advantage of being able to be positioned in the leaktight chamber 110 of an existing test vessel under ultra-high vacuum and of being able to generate a desired magnetic field while adapting to the experimental device without perturbing the ultra-high vacuum medium by handling.

As illustrated in the appended FIGURE, the system for generating a vector magnetic field 200 comprises a leaktight case 300 acting as cold mass in which cylindrical superconducting coils 210, 220, 230 are inserted. The type of superconducting coil, the dimensions, the connections as well as their relative position around the sample to analyse are described in a detailed manner in the document EP2743717. The superconducting coils 210, 220, 230 and their particular arrangement make it possible to create a magnetic field adjustable in magnitude and in direction while eliminating the putting in place of coils positioned in the median diffraction plane thereby facilitating the observation of the sample in a wide angular aperture.

The leaktight case 300 fulfils a first function of mechanically maintaining the superconducting coils 210, 220, 230, a second function of cooling the superconducting coils 210, 220, 230 by heat conduction, and a third function of leak tightness of the cryogenic vacuum existing inside the leaktight case 300 with respect to the ultra-high vacuum reigning in the leaktight chamber 110.

The leaktight case 300 has a body 350 made from a single-piece part machined from bulk aluminium, which comprises housings 310 machined very precisely (typically to $1/10^{th}$ of a millimetre) to receive and position the superconducting coils 210, 220, 230. The superconducting coils 210, 220, 230 are advantageously stuck in the housings 310 so as to optimise "thermal" contact with the leaktight case 300 and thus the cooling of the superconducting coils 210, 220, 230, which is made more homogeneous.

The leaktight case 300 comprises a network of ports (not represented) arranged in the thickness of the leaktight case to enable the passage of different electrical feeds of the superconducting coils 210, 220, 230.

The body 350 of the leaktight case 300 comprises a first through orifice 305, represented substantially along a horizontal axis, to enable the passage of the beam of photons $F_{photons}$ up to the sample to analyse, and a second through orifice 306 forming a well in its centre, represented substantially along a vertical axis, making it possible to place a sample holder 120 and a sample 10 at the centre of the magnetic field formed by the superconducting coils 210, 220, 230 and facing the beam of photons $F_{photons}$.

The system for generating a vector magnetic field 200 also comprises electrical protection elements 380 (typically protective diodes) of the superconducting coils 210, 220, 230 which are also integrated inside the leaktight case 300 and positioned in a housing 320 machined in the upper part of the leaktight case 300.

All these housings 310, 320 are made leaktight to the surrounding vacuum by placing an upper closing flange 330 in the upper part of the leaktight case 300 and a lower closing flange 340 in the lower part of the leaktight case 300. The closing flanges 330, 340 are clamped onto the body 350 of the leaktight case 300, for example by screwing, and engage with metal joints compatible with the ultra-high vacuum and with the cryogenic temperature, for example made of indium. Thus, the leaktight case 300 is made completely hermetic with respect to the exterior.

To supply the superconducting coils 210, 200 the leaktight case 300 comprises leaktight electrical power passages 390. Thus the leaktight electrical passages 390 enable the electrical connection of the coils 210, 220, 230 via the electrical protection elements 380 with current feeds 600 traversing the vessel 100. The leaktight electrical power passages 390 make it possible, via the use of superconducting wire, to create a leaktight, insulating and superconducting link between the exterior and the interior of the leaktight case 300 (i.e. at a temperature of 4K).

The exterior surface of the leaktight case 300 is treated so as to be compatible with a medium in which the ultra-high vacuum reigns (i.e. not denature or perturb the ultra-high vacuum of the vessel 110), it is cleanable and bakeable at a temperature of 80° C.

The leaktight case 300 is cooled by cooling means making it possible to reach the superconducting temperature. Advantageously, the cooling means are formed by at least one cryogenerator 500 (visible in FIG. 1) which ensures the cooling of the superconducting coils 210, 220, 230 and the electrical protection elements 380, to their operating temperature of 4K thanks notably to the high conduction of the leaktight case 300.

The leaktight case 300 is protected at the level of each of its faces by a heat shield 400 making it possible to enclose the leaktight case 300. The heat shield 400, commonly called "50K shield", makes it possible to block all radiation coming from the exterior and to ensure screening at a temperature of 50K of radiation losses and to limit thermal inputs on the cold mass at a temperature of 4K formed by the leaktight case 300. The heat shield 400 is a simple wall shield compatible with the ultra-high vacuum, that is to say that it is both heat conductor and heat reflector. The heat shield 400 makes it possible to create an isotherm directly in the leaktight chamber 110 of the test vessel 100.

The heat shield 400 is manufactured from a heat conducting material, advantageously metal, for example a sheet made of copper, aluminium or a suitable metal material have good heat conductivity.

According to an alternative embodiment, the heat shield 400 comprises a heat conducting element for example a metal sheet made of copper, aluminium or a suitable metal material having good heat conductivity, which covers for example a central core.

The heat shield 400 comprises on the surface a heat reflecting layer covering the heat conducting material.

The heat reflecting layer is deposited for example by chemical, electrochemical or physical means. The heat reflecting layer has an emissivity of the order of 0.030 and makes it possible to do without the presence of layers of super insulators in the vessel which would be incompatible with the ultra-high vacuum. The reflective layer is for example a metal layer composed of nickel.

Thus, the heat shield 400 around the leaktight case 300 plays the role of an intermediate heat shield, the function of which is to create an intermediate isothermal surface around the leaktight case 300, while benefiting from the cooling power of a first stage 50k of the cryogenerator 500. The heat shield 400 also makes it possible to limit radiative losses on the leaktight case 300 containing the superconducting coils which is cooled to a temperature of 4K. The current feeds 600 are also placed inside a heat shield 610 cooled to a temperature of 50K. The heat shield 610 is mechanically connected to the main heat shield 400 positioned around the leaktight case 300.

The cryogenerator 500 is also placed inside a heat shield 510 cooled to a temperature of 50K. The heat shield 510 is mechanically connected and the main heat shield 400 positioned around the leaktight case 300.

The cryogenerator 500 is a two-stage cryogenerator, that is to say that it comprises a first stage making it possible to cool the heat shield 400, the heat shield 610 of the current feeds 600 and the heat shield 510 of the cryogenerator 500 to a temperature of 50K and a second stage making it possible to cool the leaktight case 300 as well as the superconducting coils 210, 220, 230 to a temperature of 4K.

Advantageously, the heat shield 610 of the current feeds 600 and the heat shield 510 of the cryogenerator 500 are of the same nature as the heat shield 400 around the leaktight case 300 containing the superconducting coils.

The leaktight case 300 is maintained in the test vessel by ad hoc means, such as for example one or more chains 115 formed by metal links which are insulated from each other by epoxy parts thereby making it possible to create a thermal decoupling.

The invention claimed is:

1. A test vessel comprising a unique leaktight chamber in which an ultra-high vacuum reigns, said test vessel comprising a single system for generating a magnetic field orientable in three dimensions, said system comprising:
   superconducting coils,
   a cooling system to cool the superconducting coils to a superconducting temperature;
   a leaktight case, leaktight to the ultra-high vacuum and compatible with the ultra-high vacuum, said leaktight case enclosing said superconducting coils and being cooled by said cooling system;
   a heat shield of the leaktight case compatible with the ultra-high vacuum surrounding said leaktight case,
   wherein the ultra-high vacuum of said vessel constitutes a thermal insulation vacuum necessary for the cooling of the superconducting coils of the system for generating a vector magnetic field.

2. The test vessel according to claim 1, wherein the heat shield comprises a heat conducting element covered with a heat reflecting layer.

3. The test vessel according to claim 2, wherein the heat conducting element and/or the heat reflecting layer is metal.

4. The test vessel according to claim 2, wherein the heat conducting element is a heat conducting metal sheet made of copper or aluminium.

5. The test vessel according to claim 2, wherein the heat shield comprises a metal heat reflecting layer made of nickel.

6. The test vessel according to claim 1, wherein said leaktight case is formed by a solid one-piece body.

7. The test vessel according to claim 6, wherein said leaktight case comprises housings machined in said one-piece body for the positioning of the superconducting coils.

8. The test vessel according to claim 6, wherein said one-piece body is closed on either side, in a leaktight manner, by an end flange.

9. The test vessel according to claim 6, wherein said one-piece body comprises a housing in which protection elements of the superconducting coils are positioned.

10. The test vessel according to claim 1, wherein said leaktight case comprises leaktight, insulating and superconducting electrical power penetrations for supplying said superconducting coils.

11. The test vessel according to claim 1, wherein said leaktight case has a central well to enable the placement of a sample in the middle of the magnetic field generated by said superconducting coils.

12. The test vessel according to claim 1, wherein said cooling system is surrounded by a heat shield of the cooling system compatible with the ultra-high vacuum.

13. The test vessel according to claim 1, comprising current feeds and wherein said current feeds are surrounded by a heat shield of the current feeds.

14. The test vessel according to claim 1, wherein said cooling system has a first stage for the cooling of said heat shield of the leaktight case and/or the heat shield of the cooling system and/or the heat shield of the current feeds and a second stage for the cooling of said leaktight case and the superconducting coils to the superconducting temperature, the temperature of said first stage being above the temperature of the second stage.

15. The test vessel according to claim 1, wherein said cooling system is formed by at least one cryogenerator.

* * * * *